United States Patent
Adachi et al.

(10) Patent No.: US 10,467,990 B2
(45) Date of Patent: Nov. 5, 2019

(54) NUMERICAL CONTROLLER

(71) Applicant: FANUC CORPORATION, Minamitsuru-gun, Yamanashi (JP)

(72) Inventors: Syuuzo Adachi, Yamanashi (JP); Mamoru Kubo, Yamanashi (JP); Koichi Murata, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/484,278

(22) Filed: Apr. 11, 2017

(65) Prior Publication Data

US 2017/0301317 A1 Oct. 19, 2017

(30) Foreign Application Priority Data

Apr. 13, 2016 (JP) ................................ 2016-080427

(51) Int. Cl.
*G06T 1/00* (2006.01)
*G09G 5/36* (2006.01)
*G06T 1/20* (2006.01)
*G09G 5/00* (2006.01)

(52) U.S. Cl.
CPC .............. *G09G 5/363* (2013.01); *G06T 1/20* (2013.01); *G09G 5/003* (2013.01); *G09G 2340/14* (2013.01)

(58) Field of Classification Search
CPC .......... H04N 5/23293; H04N 5/23229; H04N 5/772; H04N 5/23245; H04N 19/59; G06T 3/40; G06T 1/20; G06T 1/60; G06T 11/60; G05B 19/056; G05B 19/19
See application file for complete search history.

(56) References Cited

U.S. PATENT DOCUMENTS

| 6,121,949 A * | 9/2000 | Ramamurthy ....... G09G 3/3611 345/101 |
| 2005/0007953 A1* | 1/2005 | Hirose ...................... G06F 9/50 370/229 |
| 2007/0263100 A1* | 11/2007 | Anada .................... H04N 5/783 348/222.1 |
| 2008/0180409 A1 | 7/2008 | Matsuda |
| 2009/0324092 A1* | 12/2009 | Aoyama ................. G06T 5/002 382/199 |
| 2012/0169741 A1* | 7/2012 | Adachi ................... G06T 13/00 345/474 |

FOREIGN PATENT DOCUMENTS

| JP | 2000-181438 A | 6/2000 |
| JP | 2008186318 A | 8/2008 |
| JP | 2011-165137 A | 8/2011 |
| JP | 2013-218478 A | 10/2013 |

OTHER PUBLICATIONS

Notification of Reasons forr Refusal for Japanese Application No. 2016-080427, dated Oct. 2, 2018 with translation, 6 pages.

* cited by examiner

*Primary Examiner* — Hau H Nguyen
(74) *Attorney, Agent, or Firm* — RatnerPrestia

(57) ABSTRACT

A numerical controller includes a drawing processing unit that draws a screen on a display unit, an image display cycle measurement processing unit that measures a display cycle of the screen, and a drawing quality change processing unit that determines drawing quality of the screen based on the display cycle or a CPU processing amount estimated from the display cycle. The drawing processing unit draws the screen according to the drawing quality determined by the drawing quality change processing unit.

6 Claims, 10 Drawing Sheets

| CPU PROCESSING AMOUNT | SMALL AMOUNT | MIDDLE AMOUNT | LARGE AMOUNT |
|---|---|---|---|
| DRAWING QUALITY | HIGH QUALITY | MIDDLE QUALITY | LOW QUALITY |
| SOLIDLY PAINTED GRADATION | TWO DIRECTIONS AND TWO COLORS | ONE DIRECTION AND TWO COLORS | NO DIRECTION AND SINGLE COLOR |
| GRAPHIC DRAWING | DECORATION SHAPE DRAWING | SIMPLE DECORATION SHAPE DRAWING | SIMPLE SHAPE DRAWING |
| ANTI-ALIASING PROCESSING OF TEXTS | NECESSARY | NOT NECESSARY | NOT NECESSARY |
| EXAMPLES OF SCREEN COMPONENTS STORED IN DRAWING-QUALITY-BASIS SHAPE DATA FILE |  |  |  |

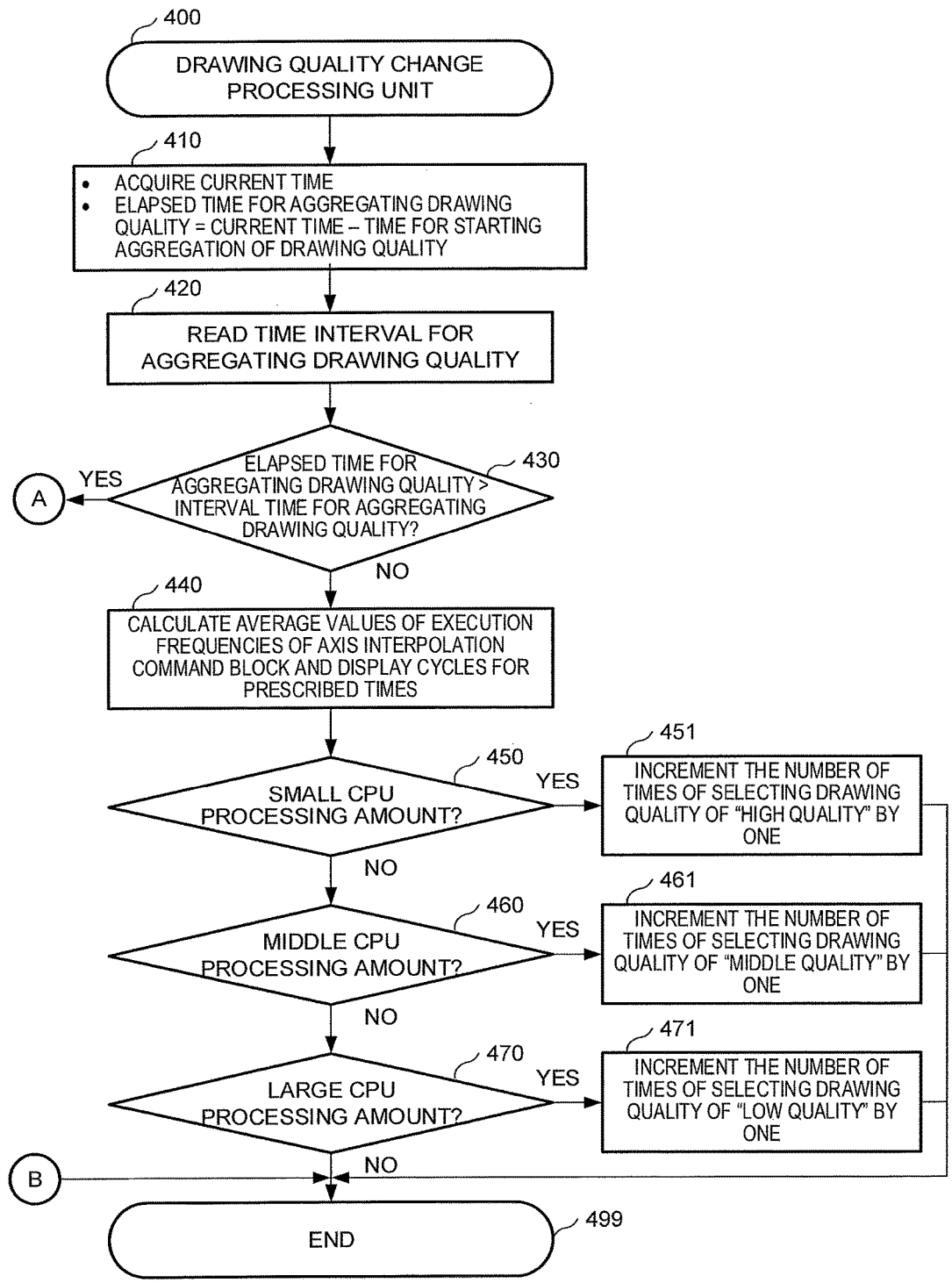

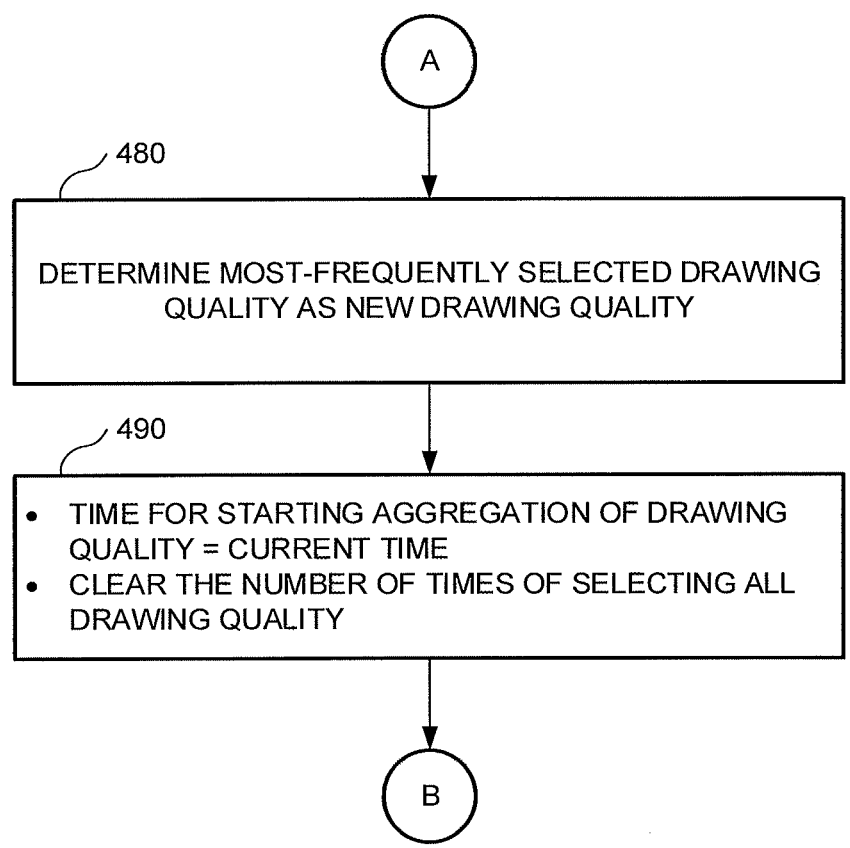

FIG.7

| CPU PROCESSING AMOUNT | SMALL AMOUNT | MIDDLE AMOUNT | LARGE AMOUNT |
|---|---|---|---|
| AVERAGE VALUE OF THE NUMBER OF TIMES OF EXECUTING AXIS INTERPOLATION COMMAND BLOCK | 0 TO 2 | 3 TO 10 | 11 OR MORE |
| AVERAGE VALUE OF DISPLAY CYCLES | AVERAGE VALUE OF DISPLAY CYCLES ≦ 1.00 SECOND | 1.00 SECOND < AVERAGE VALUE OF DISPLAY CYCLES ≦ 2.00 SECONDS | AVERAGE VALUE OF DISPLAY CYCLES > 2.00 SECONDS |
| DRAWING QUALITY | HIGH QUALITY | MIDDLE QUALITY | LOW QUALITY |
| INTERVAL TIME FOR AGGREGATING THE NUMBER OF EXECUTION TIMES | | 1 SECOND | |
| INTERVAL TIME FOR AGGREGATING DRAWING QUALITY | | 20 SECONDS | |

FIG.8

| CPU PROCESSING AMOUNT | SMALL AMOUNT | MIDDLE AMOUNT | LARGE AMOUNT |
|---|---|---|---|
| DRAWING QUALITY | HIGH QUALITY | MIDDLE QUALITY | LOW QUALITY |
| SOLIDLY PAINTED GRADATION | TWO DIRECTIONS AND TWO COLORS | ONE DIRECTION AND TWO COLORS | NO DIRECTION AND SINGLE COLOR |
| GRAPHIC DRAWING | DECORATION SHAPE DRAWING | SIMPLE DECORATION SHAPE DRAWING | SIMPLE SHAPE DRAWING |
| ANTI-ALIASING PROCESSING OF TEXTS | NECESSARY | NOT NECESSARY | NOT NECESSARY |
| EXAMPLES OF SCREEN COMPONENTS STORED IN DRAWING-QUALITY-BASIS SHAPE DATA FILE | 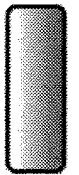 |  |  |

NUMERICAL CONTROLLER

BACKGROUND OF THE INVENTION

1. Field of the Invention

The present invention relates to a numerical controller, and in particular to a numerical controller capable of suppressing degradation in responsiveness of an operation screen by appropriately controlling a processing amount for a screen display in accordance with the state of the numerical controller.

2. Description of the Related Art

In displaying a custom screen (hereinafter simply called a screen), a numerical controller (CNC) executes processing to generate a screen based on a design prepared in advance and screen components, and redraw the entire screen at certain intervals. This being the case, when the processing amount of a central processing unit (CPU) necessary for processing other than a screen display increases due to the processing state of the numerical controller, the display cycle of the screen becomes long, which results in responsiveness deterioration of the operation of the screen.

In this regard, there have been proposed technologies for controlling screen display processing so as not to surpass the processing performance of a CPU, with the purpose of suppressing phenomena such as dropping frames, unsmoothed moving-image reproduction, and reduction in operability.

For example, Japanese Patent Application Laid-open No. 2013-218478 discloses a technology for appropriately switching, at a drawing event such as scrolling and rotation, between normal drawing and drawing that is based on the reuse of drawing data, so as to accelerate drawing.

In the technology disclosed in Japanese Patent Application Laid-open No. 2011-165137, a portable terminal displays key-input information (input information) on a display, and when the input information and the displayed information do not correspond to each other, update of the displayed information is skipped, thereby achieving reduction in a processing load on a CPU and improvement in operability.

Japanese Patent Application Laid-open No. 2000-181438 discloses a technology for selecting a moving-image display suitable for the processing performance of a CPU from among a plurality of moving-image formats, so as to allow smooth, favorable reproduction of a moving image.

Meanwhile, whereas the technologies in Patent Documents described above address the problem of dropping frames, unsmoothed moving-image reproduction, reduction in operability, etc., each of which is caused when screen display processing surpasses the processing performance of a CPU, these technologies do not address optimizing the screen display processing dynamically in response to fluctuations in the CPU processing amount (processing load) of the entire numerical controller including image display processing.

SUMMARY OF THE INVENTION

The present invention has been made in order to solve the above problem and has an object of providing a numerical controller capable of suppressing degradation in responsiveness of an operation screen by appropriately controlling a processing amount for a screen display according to the state of the numerical controller.

A first embodiment of a numerical controller according to the present invention includes: a drawing processing unit that draws a screen on a display unit; an image display cycle measurement processing unit that measures a display cycle of the screen; and a drawing quality change processing unit that determines drawing quality of the screen based on the display cycle or a CPU processing amount estimated from the display cycle. Further, the drawing processing unit draws the screen according to the determined drawing quality.

The drawing quality change processing unit may be configured to execute processing to select the drawing quality of the screen a plurality of times based on the display cycle or the CPU processing amount estimated from the display cycle within a prescribed period, and to determine the drawing quality according to the number of times of selecting the drawing quality.

A second embodiment of a numerical controller according to the present invention includes: a drawing processing unit that draws a screen on a display unit; an interpolation processing unit that executes axis interpolation processing; an axis interpolation command block aggregation processing unit that aggregates the number of times of executing an axis interpolation command block in a prescribed time; and a drawing quality change processing unit that determines drawing quality of the screen based on the number of the times of executing the axis interpolation command block or a CPU processing amount estimated from the number of the times of executing the axis interpolation command block. Further, the drawing processing unit draws the screen according to the determined drawing quality.

The drawing quality change processing unit may be configured to execute processing to select the drawing quality of the screen a plurality of times based on the number of the times of executing the axis interpolation command block or the CPU processing amount estimated from the number of the times of executing the axis interpolation command block within a prescribed period, and to determine the drawing quality according to the number of times of selecting the drawing quality.

A third embodiment of a numerical controller according to the present invention includes: a drawing processing unit that draws a screen on a display unit; an interpolation processing unit that executes axis interpolation processing; an axis interpolation command block aggregation processing unit that aggregates the number of times of executing an axis interpolation command block in a prescribed time; an image display cycle measurement processing unit that measures a display cycle of the screen; and a drawing quality change processing unit that determines drawing quality of the screen based on at least one of the display cycle and the number of the times of executing the axis interpolation command block, or a CPU processing amount estimated from at least one of the display cycle and the number of the times of executing the axis interpolation command block. Further, the drawing processing unit draws the screen according to the determined drawing quality.

The drawing quality change processing unit may be configured to execute processing to select the drawing quality of the screen a plurality of times based on at least one of the display cycle and the number of the times of executing the axis interpolation command block, or a CPU processing amount estimated from at least one of the display cycle and the number of the times of executing the axis interpolation command block, within a prescribed period, and to determine the drawing quality according to the number of times of selecting the drawing quality.

According to an embodiment of the present invention, it is possible to provide a numerical controller capable of suppressing degradation in responsiveness of an operation screen by appropriately controlling a processing amount for a screen display according to the state of the numerical controller.

BRIEF DESCRIPTION OF THE DRAWINGS

FIGS. 4A and 4B are flowcharts showing the operation of a drawing quality change processing unit in the numerical controller of FIG. 1;

FIG. 7 is a diagram showing an example of setting a drawing quality selection reference file in the numerical controller of FIG. 1; and FIG. 8 is a diagram showing an example of setting drawing quality.

DETAILED DESCRIPTION OF THE PREFERRED EMBODIMENTS

Hereinafter, a description will be given, with reference to the drawings, in detail of a specific embodiment to which the present invention is applied.

Figure 1:
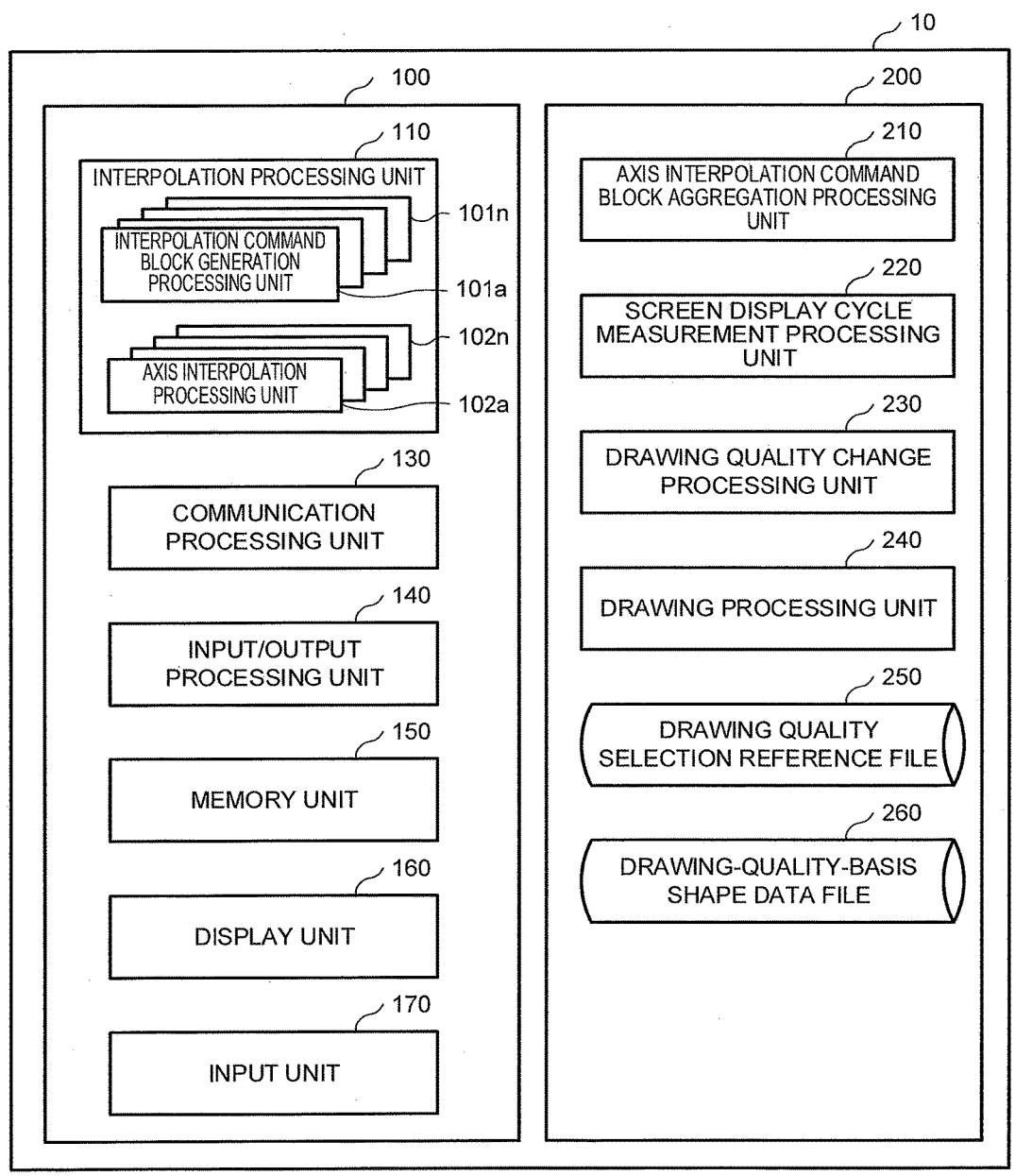
FIG. 1 is a diagram showing the configuration of a numerical controller according to an embodiment of the present invention.

FIG. 1 is a block diagram showing the configuration of a numerical controller 10 according to an embodiment of the present invention. The numerical controller 10 includes a numerical control section 100 and a screen display section 200.

The numerical control section 100 executes processing to control a machine tool (not shown) based on a given numerical control (NC) command. The numerical control section 100 includes an interpolation processing unit 110, a communication processing unit 130, an input/output processing unit 140, a memory unit 150, a display unit 160, and an input unit 170.

The interpolation processing unit 110 typically includes n processing systems to execute interpolation processing, and has first to n-th system interpolation command block generation processing units 101a to 101n that execute processing to generate an interpolation command block and first to n-th system axis interpolation processing units 102a to 102n that execute axis interpolation processing.

The communication processing unit 130 executes processing to communicate with external communication equipment. The input/output processing unit 140 executes input/output processing with external connection equipment. The memory unit 150 stores various data or programs including a NC command. The display unit 160 displays various data or the like including data on an operation screen provided by the screen display section 200 that will be described later on a display device. The input unit 170 typically executes processing to accept a user's input by a manual data input (MDI) key displayed on the operation screen of the display unit 160.

Each of the communication processing unit 130, the input/output processing unit 140, the memory unit 150, the display unit 160, and the input unit 170 described above is a constituent provided in a general numerical controller.

The screen display section 200 executes processing to display the operation screen on the display unit 160. The screen display section 200 includes an axis interpolation command block aggregation processing unit 210, a screen display cycle measurement processing unit 220, a drawing quality change processing unit 230, a drawing processing unit 240, a drawing quality selection reference file 250, and a drawing-quality-basis shape data file 260.

Each of the axis interpolation command block aggregation processing unit 210 and the screen display cycle measurement processing unit 220 executes processing to acquire a value reflecting the current loading state of the numerical controller 10. The axis interpolation command block aggregation processing unit 210 aggregates the number of times of executing the axis interpolation command block within a prescribed period. The screen display cycle measurement processing unit 220 measures the display cycle of a screen. Each of the number of the times of executing the axis interpolation command block and the display cycle of the screen is useful for indirectly estimating the processing load of the numerical controller 10.

Generally, in the numerical controller 10, the processing to generate the interpolation command block by the first to n-th system interpolation command block generation processing units 101a to 101n, the axis interpolation processing by the first to n-th system axis interpolation processing units 102a to 102n, the processing to communicate with the external communication equipment by the communication processing unit 130, and the input/output processing with the external connection equipment by the input/output processing unit 140 are executed prior to screen display processing. That is, the processing described above uses the processing performance of a CPU prior to the screen display processing. Accordingly, for example, when a minute block is being executed for machining based on the NC command, a CPU processing amount allocated to the first to n-th system interpolation command block generation processing units 101a to 101n and the first to n-th system axis interpolation processing units 102a to 102n increases, while a CPU processing amount available for the screen display processing reduces. In a conventional numerical controller, the cycle of a screen display is increased to deal with reduction in a CPU processing amount available for screen display processing. That is, in order to suppress a CPU processing amount per unit time necessary for a screen display processing, there has been assumed two approaches including reducing the CPU processing amount necessary for drawing a screen one time (i.e., reducing the data amount of the screen) and increasing an interval at which the screen is redrawn. Among the two approaches, increasing the interval at which the screen is redrawn to suppress the CPU processing amount has been conventionally adopted. However, the approach has resulted in the degradation in responsiveness of a screen operation.

On the other hand, the numerical controller 10 according to the embodiment is characterized in that the drawing quality of the screen is changed, i.e., the data amount of the screen is changed to suppress the CPU processing amount. This processing is realized by the drawing quality change processing unit 230, the drawing processing unit 240, the drawing quality selection reference file 250, and the drawing-quality-basis shape data file 260 of the screen display section 200.

The drawing-quality-basis shape data file 260 stores drawing data on screen components corresponding to a plurality of drawing quality in advance. Further, the drawing quality selection reference file 250 retains determination conditions for the drawing quality in advance. FIG. 7 shows an example of the drawing quality selection reference file 250.

In the example of FIG. 7, the CPU processing amount is divided into three levels based on the number of the times of executing the axis interpolation command block and the display cycle, and the drawing quality corresponding to each of the CPU processing amounts is defined. In addition, in the drawing quality selection reference file 250 shown in FIG. 7, an interval time for aggregating the number of the times of executing the axis interpolation command block and an interval time for aggregating the drawing quality are also defined. The interval time for aggregating the number of the times of executing the axis interpolation command block and the interval time for aggregating the drawing quality described above are a value used when the axis interpolation command block aggregation processing unit 210 counts the number of the times of executing the axis interpolation command block and a value used when the drawing quality change processing unit 230 determines the drawing quality, respectively.

The interval time for aggregating the number of the times of executing the axis interpolation command block and the interval time for aggregating the drawing quality are not necessarily defined in the drawing quality selection reference file 250 but may be stored in any storage region or the like so long as they are allowed to be referred by the axis interpolation command block aggregation processing unit 210 and the screen display cycle measurement processing unit 220.

Further, FIG. 8 shows an example of the screen components stored in the drawing-quality-basis shape data file 260. In the example of FIG. 8, three types of the screen components of high quality, middle quality, and low quality are prepared in advance corresponding to the three levels of the CPU processing amounts.

The drawing quality change processing unit 230 executes processing to determine the drawing quality based on values collected by the axis interpolation command block aggregation processing unit 210 and the screen display cycle measurement processing unit 220 and the determination conditions defined in the drawing quality selection reference file 250.

Based on the drawing quality determined by the drawing quality change processing unit 230, the drawing processing unit 240 reads screen components to be used from the drawing-quality-basis shape data file 260. Then, the drawing processing unit 240 draws the screen using the read screen components.

Figure 2:
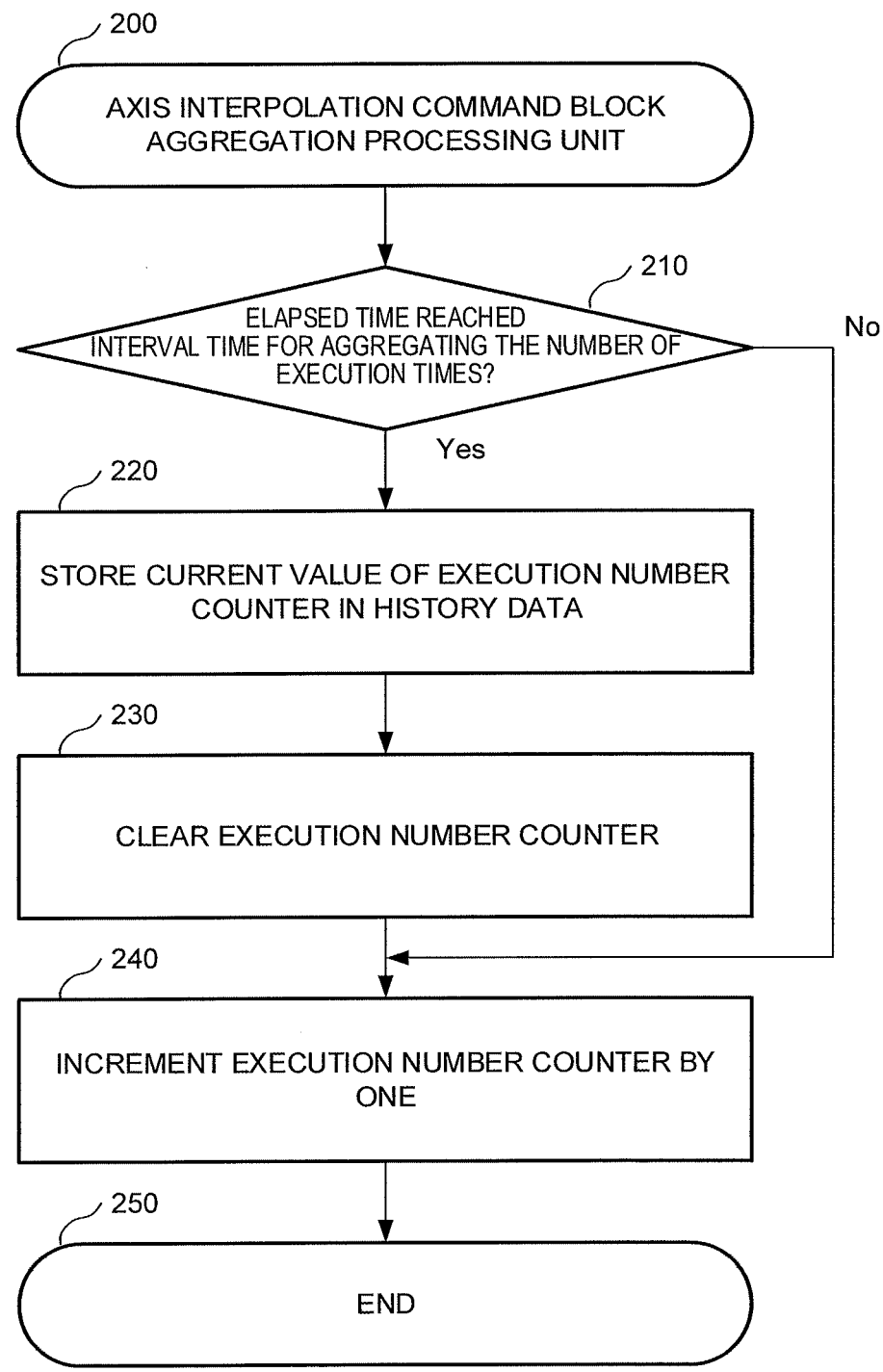
FIG. 2 is a flowchart showing the operation of an axis interpolation command block aggregation processing unit in the numerical controller of FIG. 1.

Next, a description will be given, with reference to the flowchart of FIG. 2, of the operation of the axis interpolation command block aggregation processing unit 210 in the screen display section 200.

Note that in the embodiment, the axis interpolation command block aggregation processing unit 210 is assumed to have history data representing an array for storing a plurality of the aggregation values of the number of the times of executing the axis interpolation command block, an execution number counter representing a variable for counting the number of the times of executing the axis interpolation command block, and a timer for measuring an elapsed time.

Step 200: The first to n-th system axis interpolation processing units 102a to 102n typically call the axis interpolation command block aggregation processing unit 210 when starting the execution of the axis interpolation command block. With this call as a trigger, the axis interpolation command block aggregation processing unit 210 executes the following aggregation processing.

Step 210: The axis interpolation command block aggregation processing unit 210 refers to the drawing quality selection reference file 250 to read the interval time for aggregating the number of the times of executing the axis interpolation command block. For example, when referring to the drawing quality selection reference file 250 of FIG. 7, the axis interpolation command block aggregation processing unit 210 acquires "one second" as the interval time for aggregating the number of the times of executing the axis interpolation command block.

The axis interpolation command block aggregation processing unit 210 starts the measurement of an elapsed time with the timer when the axis interpolation command block is executed for the first time. When the timer has been already started, the axis interpolation command block aggregation processing unit 210 determines whether the elapsed time has reached the interval time for aggregating the number of the times of executing the axis interpolation command block. When the elapsed time has not reached the interval time for aggregating the number of the times of executing the axis interpolation command block, the processing proceeds to step 240. When the elapsed time has reached the interval time for aggregating the number of the times of executing the axis interpolation command block, the processing proceeds to step 220.

Step 220 to Step 230: The axis interpolation command block aggregation processing unit 210 stores the current value of the execution number counter in the history data. When the history data is full, the axis interpolation command block aggregation processing unit 210 deletes the oldest data (the aggregate value of the number of times of executing the axis interpolation command block) and then stores the current value of the execution number counter. In addition, the axis interpolation command block aggregation processing unit 210 clears (i.e., zeros) the execution number counter and prepares for next aggregation. Moreover, the axis interpolation command block aggregation processing unit 210 clears the timer.

Step 240: The axis interpolation command block aggregation processing unit 210 increments the value of the execution number counter by one.

Step 250: The axis interpolation command block aggregation processing unit 210 ends the processing.

When a series of the above processing is repeatedly executed, the number of the times of executing the axis interpolation command block for the interval time for aggregating the number of the times of executing the axis interpolation command block is recorded on the history data over a plurality of times in the past.

Figure 3:
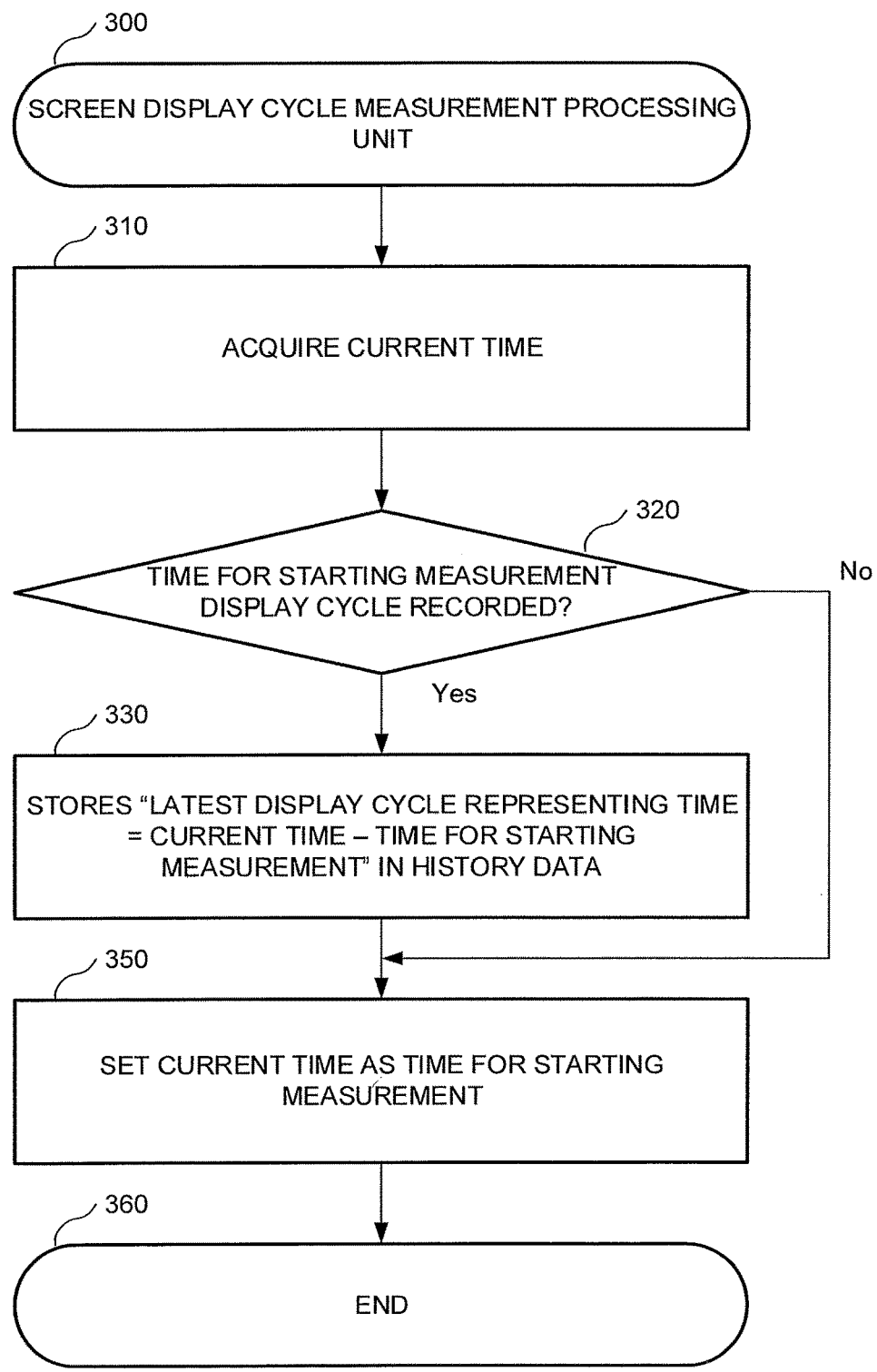
FIG. 3 is a flowchart showing the operation of a screen display cycle measurement processing unit in the numerical controller of FIG. 1.

Next, a description will be given, with reference to the flowchart of FIG. 3, of the operation of the screen display cycle measurement processing unit 220.

Note that in the embodiment, the screen display cycle measurement processing unit 220 is assumed to have history data representing an array for storing a plurality of screen display cycles and a variable for recording a time for starting the measurement of the display cycle.

Step 300: The drawing processing unit 240 calls the screen display cycle measurement processing unit 220 every time the drawing of the screen is executed. With this call as a trigger, the screen display cycle measurement processing unit 220 starts the following aggregation processing.

Step 310: The screen display cycle measurement processing unit 220 acquires a current time.

Step 320: The screen display cycle measurement processing unit 220 determines whether the time for starting the measurement of the display cycle has been recorded or not. When the time for starting the measurement of the display cycle has not been recorded, the processing proceeds to step 350. When the time for starting the measurement of the display cycle has been recorded, the processing proceeds to step 330.

Step 330: The screen display cycle measurement processing unit 220 stores the latest display cycle representing a time obtained by subtracting the time for starting the measurement from the current time in the history data. When the history data is full, the screen display cycle measurement processing unit 220 deletes the oldest data (measurement value of the display cycle) and then stores the latest display cycle.

Step 350: The screen display cycle measurement processing unit 220 sets the current time as the time for starting the measurement.

When a series of the above processing is repeatedly executed, the screen display cycle is recorded on the history data over a plurality of times in the past.

Next, a description will be given, with reference to the flowcharts of FIGS. 4A and 4B, of the operation of determining the drawing quality by the drawing quality change processing unit 230.

Note that in the embodiment, the drawing quality change processing unit 230 is assumed to have a variable for recording a time for starting the measurement of the time interval for aggregating the number of the times of executing the axis interpolation command block and a variable for recording the number of the times of selecting the respective drawing quality (three types of the high quality, the middle quality, and the low quality in the embodiment).

Step 400: The drawing processing unit 240 calls the drawing quality change processing unit 230 every time the drawing of the screen is executed. With this call as a trigger, the drawing quality change processing unit 230 starts the following aggregation processing.

Step 410: The drawing quality change processing unit 230 acquires a current time. In addition, the drawing quality change processing unit 230 handles a time obtained by subtracting a time for starting the aggregation of the drawing quality from the current time as an elapsed time for aggregating the drawing quality. Note that the initial value of the time for starting the aggregation of the drawing quality is the current time.

Step 420: The drawing quality change processing unit 230 refers to the drawing quality selection reference file 250 to read the interval time for aggregating the drawing quality. For example, when referring to the drawing quality selection reference file 250 of FIG. 7, the drawing quality change processing unit 230 acquires "20 seconds" as the interval time for aggregating the drawing quality.

Step 430: The drawing quality change processing unit 230 compares the elapsed time for aggregating the drawing quality with the interval time for aggregating the drawing quality. When the elapsed time for aggregating the drawing quality is greater than the interval time for aggregating the drawing quality, the processing proceeds to step 480. Otherwise, the processing proceeds to step 440.

Step 440: The drawing quality change processing unit 230 calculates the average value of the number of the times of executing the axis interpolation command block and the average value of the display cycles within a certain period of time in the past with the current time as a start point. Typically, the drawing quality change processing unit 230 calculates the average value of the number of the times of executing the axis interpolation command block for the latest prescribed times (for example, three times) among the number of the times of executing the axis interpolation command block recorded on the axis interpolation command block aggregation processing unit 210. Similarly, the drawing quality change processing unit 230 calculates the average value of the display cycles for the latest prescribed times (for example, three times) among the display cycles recorded on the screen display cycle measurement processing unit 220.

Subsequently, the drawing quality change processing unit 230 determines a current CPU processing amount through the processing of step 450 to step 471. Specifically, the drawing quality change processing unit 230 compares the average value of the number of the times of executing the axis interpolation command block and the average value of the display cycles with the determination conditions preset in the drawing quality selection reference file 250 to determine the CPU processing amount. In the embodiment, it is assumed that the three levels of the CPU processing amounts including "small amount," "middle amount," and "large amount," and the average values of the number of the times of executing the axis interpolation command block and the average values of the display cycles corresponding to the respective CPU processing amounts are defined in the drawing quality selection reference file 250 in advance.

Step 450 to Step 451: The drawing quality change processing unit 230 refers to the drawing quality selection reference file 250 to acquire the average value of the number of the times of executing the axis interpolation command block and the average value of the display cycles corresponding to "small amount" of the CPU processing amount. In the example of FIG. 7, the drawing quality change processing unit 230 acquires "0 to 2" as the number of the times of executing the axis interpolation command block and "average value of display cycles≤1.00 second" as the average value of the display cycles.

The drawing quality change processing unit 230 determines whether at least one of the average value of the number of the times of executing the axis interpolation command block and the average value of the display cycles calculated in step 440 falls within the average value of the number of the times of executing the axis interpolation command block and the average value of the display cycles acquired here. Where applicable, the drawing quality change processing unit 230 increments the number of times of selecting the drawing quality of "high quality" corresponding to "small amount" of the CPU processing amount in the drawing quality selection reference file 250 and the processing proceeds to step 499. Otherwise, the processing proceeds to step 460.

Step 460 to Step 461: The drawing quality change processing unit 230 refers to the drawing quality selection reference file 250 to acquire the average value of the number of the times of executing the axis interpolation command block and the average value of the display cycles corresponding to "middle amount" of the CPU processing amount. In the example of FIG. 7, the drawing quality change processing unit 230 acquires "3 to 10" as the number of the times of executing the axis interpolation command block and "1.00 second<average value of display cycles≤2.00 seconds" as the average value of the display cycles.

The drawing quality change processing unit 230 determines whether at least one of the average value of the number of the times of executing the axis interpolation command block and the average value of the display cycles calculated in step 440 falls within the average value of the number of the times of executing the axis interpolation command block and the average value of the display cycles acquired here. Where applicable, the drawing quality change processing unit 230 increments the number of the times of selecting the drawing quality of "middle quality" corresponding to "middle amount" of the CPU processing amount in the drawing quality selection reference file 250 and the processing proceeds to step 499. Otherwise, the drawing quality change processing unit 230 proceeds to step 470.

Step 470 to Step 471: The drawing quality change processing unit 230 refers to the drawing quality selection reference file 250 to acquire the average value of the number of the times of executing the axis interpolation command block and the average value of the display cycles corresponding to "large amount" of the CPU processing amount. In the example of FIG. 7, the drawing quality change processing unit 230 acquires "11 or more" as the number of the times of executing the axis interpolation command block and "average value of display cycles>2.00 seconds" as the average value of the display cycles.

The drawing quality change processing unit 230 determines whether at least one of the average value of the number of the times of executing the axis interpolation command block and the average value of the display cycles calculated in step 440 falls within the average value of the number of the times of executing the axis interpolation command block and the average value of the display cycles acquired here. Where applicable, the drawing quality change processing unit 230 increments the number of the times of selecting the drawing quality of "low quality" corresponding to "large amount" of the CPU processing amount in the drawing quality selection reference file 250 and the processing proceeds to step 499. Otherwise, the processing proceeds to step 470.

Step 480: The drawing quality change processing unit 230 determines the most-frequently selected drawing quality among the respective drawing quality (the high quality, the middle quality, and the low quality) as new drawing quality. That is, the drawing quality change processing unit 230 determines the drawing quality suitable for the CPU processing amount at that point every time the interval time for aggregating the drawing quality elapses. By the adjustment of the elapsed time for aggregating the drawing quality, it is possible to control the change frequency of the drawing quality. For example, when the interval time for aggregating the drawing quality is set at a certain long time (such as 20 seconds), it is possible to reduce a sense of discomfort caused when the drawing quality frequently changes in a short period of time.

Step 490: The drawing quality change processing unit 230 resets the time for starting the aggregation of the drawing quality to the current time. In addition, the drawing quality change processing unit 230 clears (i.e., zeros) the number of the times of selecting all the drawing quality. Thus, the drawing quality change processing unit 230 is allowed to prepare for the next aggregation.

Step 499: The drawing quality change processing unit 230 ends the processing.

When a series of the above processing is repeatedly executed, the number of the times of selecting the respective drawing quality is cumulatively recorded over the interval time for aggregating the drawing quality.

Note that the embodiment shows the example in which the three levels of the drawing quality are defined in the drawing quality selection reference file 250, but the present invention is not limited to the example. That is, two levels or four or more levels of drawing quality may be defined. In view of the effect of responsiveness degradation, it is possible to set an appropriate number of levels.

In addition, as the determination conditions set in the drawing quality selection reference file 250, it is possible to set appropriate values according to the hardware performance, the number of systems, the number of total control axes, the execution/non-execution of controlling processing for advanced processing path calculation, or the like of the numerical controller 10. Preferably, it is possible to input the determination conditions set in the drawing quality selection reference file 250 to the numerical controller 10 from an outside in a form such as a setting file. For example, when the determination conditions are included as a constituent of screen display data, it is possible for a user to edit the determination conditions during the generation of screen data. In addition, it is preferable to display the determination conditions on the display unit 160 of the numerical controller 10 and allow the edit of the determination conditions using the input unit 170.

Figure 5A:
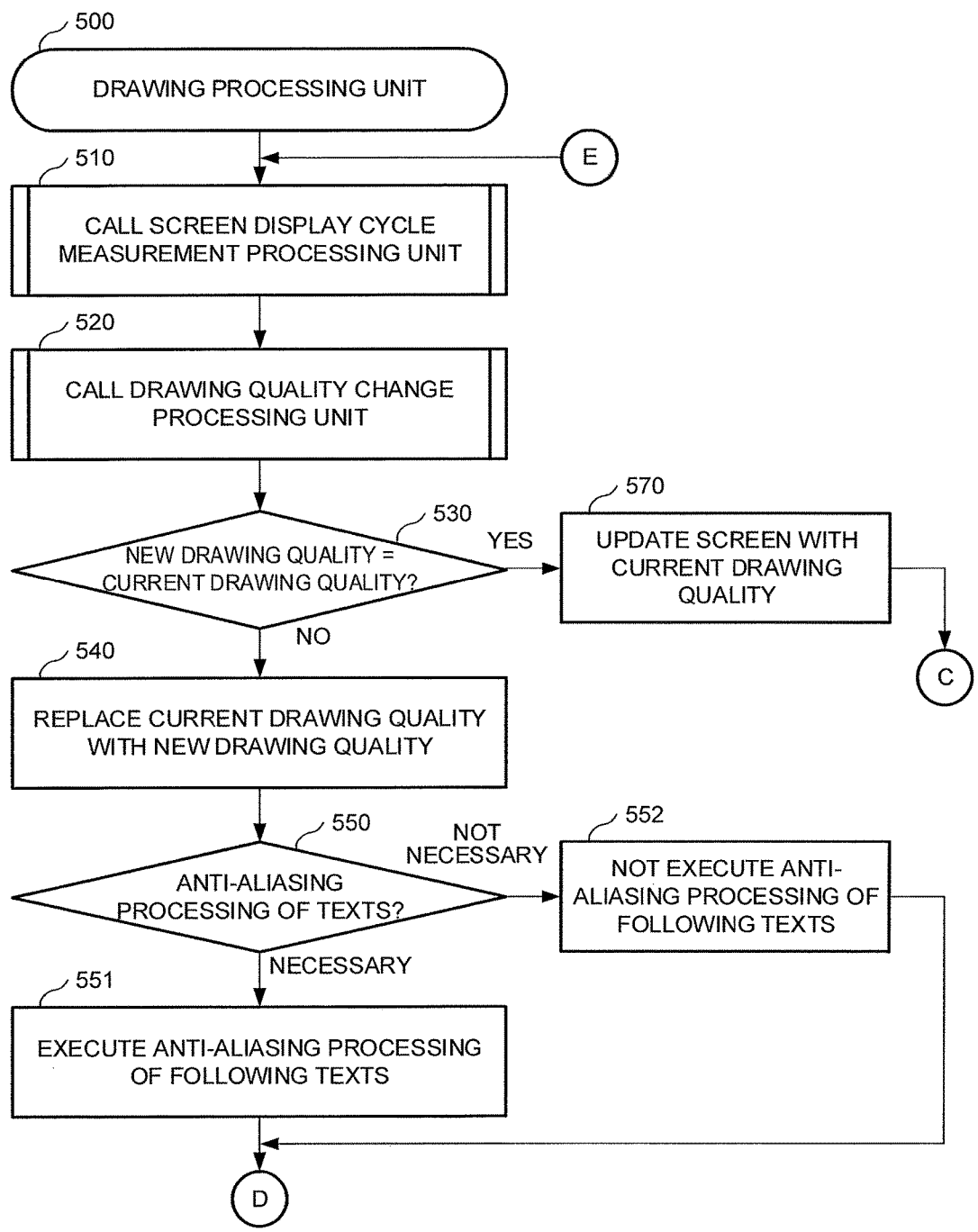
FIGS. 5A and 5B are flowcharts showing the operation of a drawing processing unit in the numerical controller of FIG. 1.
Figure 5B:
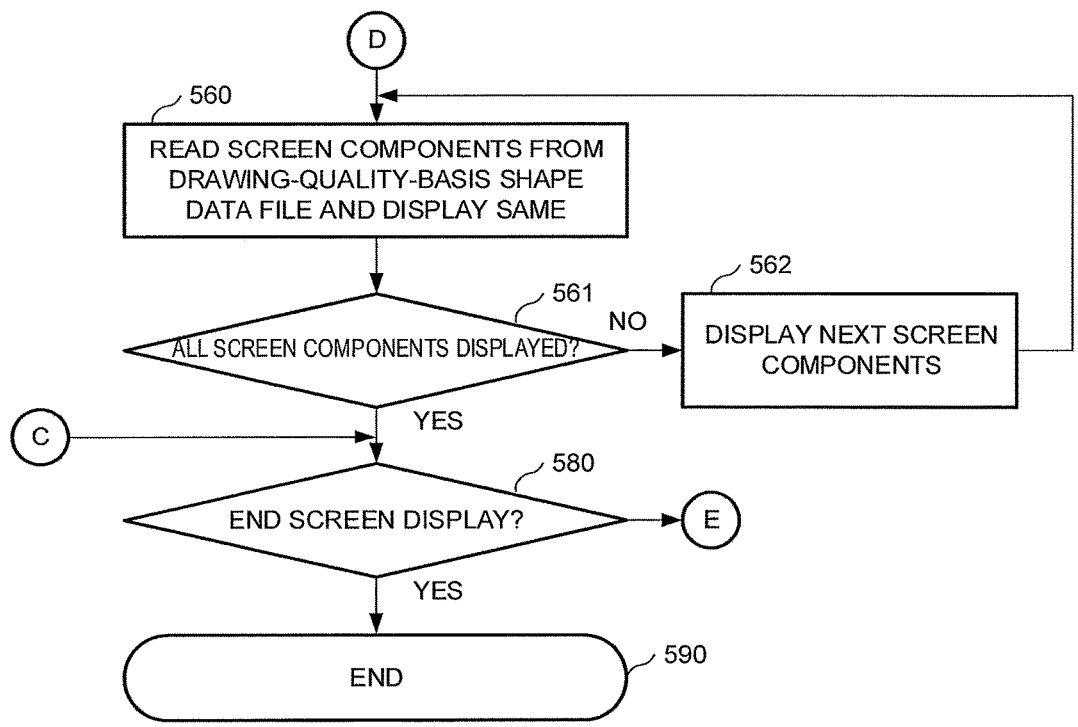

Next, a description will be given, with reference to the flowcharts of FIGS. 5A and 5B, of the operation of the drawing processing unit 240.

Step 500: The drawing processing unit 240 executes a screen display with current drawing quality at a prescribed certain time interval.

Step 510: The drawing processing unit 240 calls and executes the screen display cycle measurement processing unit 220.

Step 520: The drawing processing unit 240 calls and executes the drawing quality change processing unit 230.

Step 530: The drawing processing unit 240 determines whether drawing quality newly determined by the drawing quality change processing unit 230 is the same as the current drawing quality. When the drawing quality newly determined by the drawing quality change processing unit 230 is the same as the current drawing quality, the processing proceeds to step 570.

On the other hand, when the new drawing quality has been already determined by the drawing quality change processing unit 230, the processing proceeds to step 540.

Step 540: The drawing processing unit 240 replaces the current drawing quality with the drawing quality newly determined by the drawing quality change processing unit 230. Then, in order to draw the screen with the new drawing quality, the drawing processing unit 240 executes the processing of step 550 to step 561.

Step 550 to Step 552: The drawing processing unit 240 refers to the drawing-quality-basis shape data file 260 to determine whether anti-aliasing processing of texts with the new drawing quality is necessary or not. When the anti-aliasing processing of texts is necessary, the drawing processing unit 240 executes the anti-aliasing processing of texts. When the anti-aliasing processing of texts is not necessary, the drawing processing unit 240 does not execute the anti-aliasing processing of texts.

Step 560: The drawing processing unit 240 refers to the drawing-quality-basis shape data file 260 to acquire screen components corresponding to the new drawing quality and executes drawing with the screen components. In the example of FIG. 8, the screen components (such as buttons and lamps) of the modes of solidly painted gradation and graphic drawing corresponding to the respective drawing quality are stored. In the example, screen components having much decoration and gradation are selected when the drawing quality is high, and screen components having simplified decoration and gradation or having no decoration and gradation are selected as the drawing quality becomes lower. As the decoration and the gradation are simplified or omitted, the CPU processing amount necessary for the drawing processing of the screen components reduces.

Step 570: The drawing processing unit 240 redraws the screen with the current drawing quality, i.e., the same drawing quality as the previous one.

Step 580 to Step 590: The drawing processing unit 240 ends the processing when all the constituents of the screen are displayed.

By a series of the above processing, it is possible for the drawing processing unit 240 to draw the screen with the drawing quality determined by the drawing quality change processing unit 230.

Figure 6:
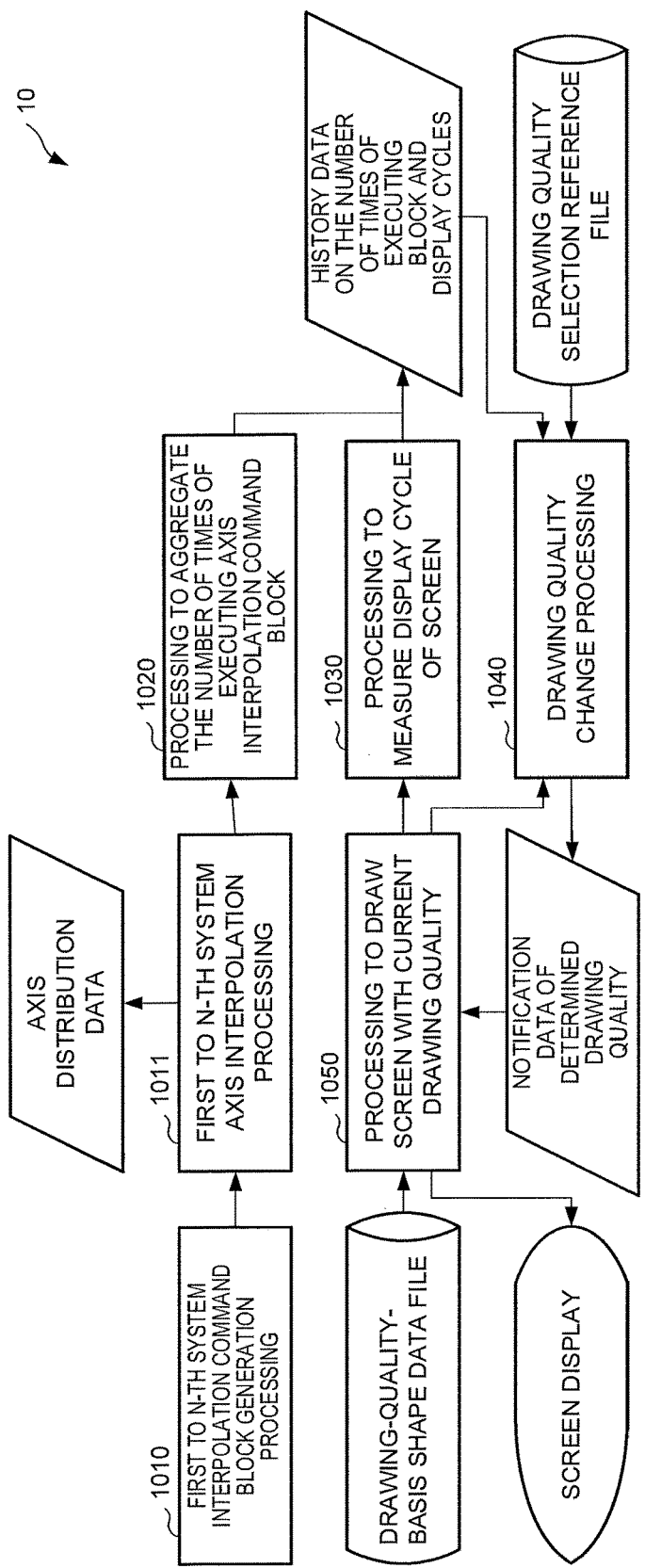
FIG. 6 is a diagram showing the operation of the numerical controller of FIG. 1.

Finally, a description will be given, with reference to the flowchart of FIG. 6, of the entire operation of the numerical controller 10.

Step 1010 to Step 1011: The interpolation processing unit 110 executes the axis interpolation processing. Specifically, the first to n-th system interpolation command block generation processing units 101a to 101n first execute the processing to generate the interpolation command block. Next, the first to n-th system axis interpolation processing units 102a to 102n execute the axis interpolation processing to output axis distribution data.

Step 1020: The axis interpolation command block aggregation processing unit 210 is called every time the axis interpolation of the interpolation command block generated by the first to n-th system interpolation command block generation processing units 101a to 101n in the interpolation processing unit 110 starts. The axis interpolation command block aggregation processing unit 210 aggregates the number of times of executing the axis interpolation command block for every certain period of time.

Step 1050: The drawing processing unit 240 draws the screen with current drawing quality and displays the same on the display unit 160. At this time, the screen components or the like defined in the drawing-quality-basis shape data file 260 is used.

Step 1030: The screen display cycle measurement processing unit 220 is called every time the drawing processing unit 240 redraws the screen. The screen display cycle measurement processing unit 220 measures the display cycle of the screen.

Step 1040: The drawing quality change processing unit 230 is called every time the drawing processing unit 240 redraws the screen. The drawing quality change processing unit 230 determines appropriate drawing quality based on the number of the times of executing the axis interpolation command block aggregated by the axis interpolation command block aggregation processing unit 210, the display cycle of the screen measured by the screen display cycle measurement processing unit 220, and the determination conditions defined in the drawing quality selection reference file 250. The drawing quality change processing unit 230 notifies the drawing processing unit 240 of the determined drawing quality. Here, when the drawing quality has been changed compared with the previous one, the drawing processing unit 240 draws the screen with the new drawing quality from this point.

According to the embodiment, the drawing quality change processing unit 230 determines appropriate the drawing quality corresponding to the CPU processing amount at that point based on the number of the times of executing the axis interpolation command block aggregated by the axis interpolation command block aggregation processing unit 210, the display cycle of the screen measured by the screen display cycle measurement processing unit 220, and the determination conditions defined in the drawing quality selection reference file 250. As described above, the drawing quality is improved or reduced as the CPU processing amount fluctuates according to the processing state or the like of the numerical controller 10, whereby it is possible to suppress the CPU processing amount per unit time necessary for a screen display and adjust the display cycle of the screen so as not to be long. Thus, it is possible to suppress degradation in responsiveness when operating the screen.

Note that the present invention is not limited to the above various embodiments but any change such as the replacement, omission, addition, and rearrangement of constituents may be made within the scope. For example, in the above embodiments, the CPU processing amount is determined based on one of the number of the times of executing the axis interpolation command block aggregated by the axis interpolation command block aggregation processing unit 210 and the display cycle of the screen measured by the screen display cycle measurement processing unit 220. However, for example, the CPU processing amount may be determined based on whether both the number of the times of executing the axis interpolation command block and the display cycle of the screen satisfy the determination conditions. Alternatively, the CPU processing amount may be determined based on any data determined to have a correlation with the CPU processing amount, e.g., data capable of being acquired from the communication processing unit 130 or the input/output processing unit 140, and the combination between the data and the number of the times of executing the axis interpolation command block or the display cycle of the screen.

In addition, the above embodiments describe the configuration in which the drawing quality change processing unit 230 accumulates the results of selecting the drawing quality over a certain period of time, but the present invention does not necessarily include the configuration. That is, a configuration in which new drawing quality is determined every time the drawing quality change processing unit 230 is executed without accumulating the results of selecting the drawing quality is also included in the scope of the present invention.

The invention claimed is:

1. A numerical controller having a drawing processing unit that draws a screen on a display unit, the numerical controller comprising:
   an image display cycle measurement processing unit that measures a refresh rate of the screen; and
   a drawing quality change processing unit that determines drawing quality of the screen based on a CPU processing amount estimated from the refresh rate, wherein
   the drawing processing unit draws the screen according to the determined drawing quality.

2. The numerical controller according to claim 1, wherein the drawing quality change processing unit is configured to execute processing to select the drawing quality of the screen a plurality of times based on the CPU processing amount estimated from the refresh rate within a prescribed period, and to determine the drawing quality according to the number of times of selecting the drawing quality.

3. A numerical controller having a drawing processing unit that draws a screen on a display unit, the numerical controller comprising:
   an interpolation processing unit that executes axis interpolation processing;
   an axis interpolation command block aggregation processing unit that aggregates the number of times of executing an axis interpolation command block in a prescribed time; and
   a drawing quality change processing unit that determines drawing quality of the screen based on a CPU processing amount estimated from the number of the times of executing the axis interpolation command block, wherein
   the drawing processing unit draws the screen according to the determined drawing quality.

4. The numerical controller according to claim 3, wherein the drawing quality change processing unit is configured to execute processing to select the drawing quality of the screen a plurality of times based on the number of the times of executing the axis interpolation command block or the CPU processing amount estimated from the number of times of executing the axis interpolation command block within a prescribed period, and to determine the drawing quality according to the number of times of selecting the drawing quality.

5. A numerical controller having a drawing processing unit that draws a screen on a display unit, the numerical controller comprising:
   an interpolation processing unit that executes axis interpolation processing;
   an axis interpolation command block aggregation processing unit that aggregates the number of times of executing an axis interpolation command block in a prescribed time;
   an image display cycle measurement processing unit that measures a refresh rate of the screen; and
   a drawing quality change processing unit that determines drawing quality of the screen based on a CPU processing amount estimated from at least one of the refresh rate and the number of the times of executing the axis interpolation command block, wherein
   the drawing processing unit draws the screen according to the determined drawing quality.

6. The numerical controller according to claim 5, wherein the drawing quality change processing unit is configured to execute processing to select the drawing quality of the screen a plurality of times based on at least one of the refresh rate and the number of the times of executing the axis interpolation command block, or a CPU processing amount estimated from at least one of the refresh rate and the number of the times of executing the axis interpolation command block, within a prescribed period, and to determine the drawing quality according to the number of times of selecting the drawing quality.

* * * * *